US012739170B2

(12) United States Patent
Lo et al.

(10) Patent No.: US 12,739,170 B2
(45) Date of Patent: Sep. 15, 2026

(54) WORKFLOW-BASED CONFIGURATION OF DEVICES FROM A CLOUD SAAS CONTROLLER

(71) Applicant: Cisco Technology, Inc., San Jose, CA (US)

(72) Inventors: Jeffrey Yi Dar Lo, Cupertino, CA (US); Dan Talayco, Mountain View, CA (US); Robert Rodgers, Mountain View, CA (US); Kyle Andrew Donald Mestery, Woodbury, MN (US); TJ Giuli, Mountain View, CA (US); Pradeep B. Chulliyan, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 18/506,065

(22) Filed: Nov. 9, 2023

(65) Prior Publication Data

US 2025/0158881 A1 May 15, 2025

(51) Int. Cl.
*H04L 41/0816* (2022.01)
*G06F 9/48* (2006.01)
(Continued)

(52) U.S. Cl.
CPC ........ *H04L 41/0816* (2013.01); *G06F 9/4843* (2013.01); *H04L 41/0654* (2013.01); *H04L 41/0686* (2013.01); *H04L 41/40* (2022.05)

(58) Field of Classification Search
None
See application file for complete search history.

(56) References Cited

U.S. PATENT DOCUMENTS 7,711,984 B2 * 5/2010 Tenenti ............... H04L 41/5054 714/15
9,413,604 B2 * 8/2016 Kowalski ............ H04L 41/0803
(Continued)

FOREIGN PATENT DOCUMENTS

CN 114500260 A 5/2022
EP 4161003 A1 4/2023

OTHER PUBLICATIONS

International Search Report and Written Opinion for International Application No. PCT/US2024/052224, mailed Jan. 23, 2025, 17 Pages.

*Primary Examiner* — Ranodhi Serrao
(74) *Attorney, Agent, or Firm* — Rutan & Tucker, LLP; Ravi Mohan; Marc A. McClain

(57) ABSTRACT

Described herein are devices, systems, methods, and processes for configuring network devices in an on-premises data center from a cloud-based controller using a workflow-based approach. A user can design a network, and can create tasks related to the network configuration. A cloud-based network controller may translate a task into a workflow including one or more actions, and may cause the actions to be executed on the devices according to the workflow. The network devices may then provide feedback about any failed configurations. The network devices can also wait for further instructions from the cloud-based network controller. The network configuration tasks can include, by way of non-limiting examples, creating or deleting a virtual network, or adding or removing hosts from a virtual network. The approach may bring about consistent and error-free configurations, maintain uninterrupted connectivity with the cloud controller by the network devices, and quickly address issues with the configuration.

20 Claims, 9 Drawing Sheets

(51) Int. Cl.

| | |
|---|---|
| ***H04L 41/0654*** | (2022.01) |
| ***H04L 41/0686*** | (2022.01) |
| ***H04L 41/40*** | (2022.01) |

(56) References Cited

U.S. PATENT DOCUMENTS

| | | | | |
|---|---|---|---|---|
| 9,641,394 | B2 * | 5/2017 | Jubran | H04L 41/12 |
| 9,923,787 | B2 * | 3/2018 | Ngoo | H04L 43/04 |
| 10,205,638 | B1 * | 2/2019 | Angrish | H04L 41/122 |
| 10,742,501 | B1 * | 8/2020 | Pianigiani | H04L 41/40 |
| 10,819,572 | B2 * | 10/2020 | Szigeti | H04L 41/084 |
| 11,150,973 | B2 * | 10/2021 | Mamillapalli | G06F 11/0709 |
| 11,252,030 | B2 * | 2/2022 | Parekh | H04L 41/0816 |
| 11,316,738 | B2 * | 4/2022 | Pianigiani | H04L 41/0895 |
| 11,431,567 | B1 * | 8/2022 | JeevaRaj | H04L 41/22 |
| 11,483,290 | B2 * | 10/2022 | Radhakrishnan | H04L 63/0263 |
| 2008/0244565 | A1 * | 10/2008 | Levidow | G06F 9/5038 717/176 |
| 2008/0294418 | A1 * | 11/2008 | Cleary | H04L 41/16 715/764 |
| 2012/0110572 | A1 * | 5/2012 | Kodi | G06F 9/45558 718/1 |
| 2013/0198346 | A1 * | 8/2013 | Jubran | H04L 41/12 709/224 |
| 2015/0170088 | A1 * | 6/2015 | Rizk | G06Q 10/06316 705/7.26 |
| 2015/0281322 | A1 * | 10/2015 | Dingwell | G06F 9/54 715/740 |
| 2017/0344921 | A1 * | 11/2017 | Leonelli | H04W 4/50 |
| 2018/0025301 | A1 * | 1/2018 | Paul | G06Q 10/0633 705/7.27 |
| 2018/0101395 | A1 * | 4/2018 | Aleksandrov | G06F 9/5077 |
| 2018/0365096 | A1 * | 12/2018 | Mamillapalli | G06F 11/0778 |
| 2019/0140915 | A1 * | 5/2019 | Flavel | H04L 41/22 |
| 2020/0162319 | A1 * | 5/2020 | Szigeti | H04L 43/04 |
| 2020/0162328 | A1 * | 5/2020 | Valenza | H04W 48/16 |
| 2020/0162337 | A1 * | 5/2020 | Jain | H04L 43/08 |
| 2020/0192975 | A1 * | 6/2020 | Maes | H04L 67/10 |
| 2021/0019131 | A1 * | 1/2021 | Tulsian | G06F 8/63 |
| 2021/0234898 | A1 * | 7/2021 | Desai | H04L 63/104 |
| 2022/0113988 | A1 * | 4/2022 | Swvigaradoss | G06F 3/04842 |
| 2022/0150119 | A1 * | 5/2022 | Parekh | H04L 41/122 |
| 2022/0164318 | A1 * | 5/2022 | Mann | G06Q 10/0633 |
| 2022/0166679 | A1 * | 5/2022 | Hafeez | H04L 41/145 |
| 2022/0209991 | A1 * | 6/2022 | Ritchie | H04L 12/4641 |
| 2022/0217047 | A1 * | 7/2022 | Pianigiani | G06F 9/4416 |
| 2022/0294693 | A1 * | 9/2022 | JeevaRaj | H04L 41/0883 |
| 2023/0078773 | A1 * | 3/2023 | Woan | H04L 41/12 709/224 |
| 2023/0171151 | A1 * | 6/2023 | Madsen | G06F 3/0484 709/220 |
| 2025/0062970 | A1 * | 2/2025 | Shi | H04W 4/70 |

* cited by examiner

106
USER NODE

102
NETWORK CONTROLLER
104B
S1
S2
L1
L2
L3
L4
104A
S1
S2
L1
L2
L3
L4
100

306
USER NODE

312
INDICATION OF TASK
304
NETWORK DEVICE
REMEDIAL/ADDITIONAL
COMMAND/CONFIGURATION
318
316
FEEDBACK
302
NETWORK CONTROLLER
314
COMMAND/
CONFIGURATION
300

940
LOCAL AREA NETWORK
900
DEVICE(S)
912
NETWORK INTERFACE CONTROLLER
916
INPUT/OUTPUT CONTROLLER
906
CHIPSET
PROCESSOR(S)
RAM
ROM
STORAGE CONTROLLER
904
908
910
914
918
STORAGE
920
OPERATING SYSTEM
922
APPLICATIONS
924
NETWORK MANAGEMENT LOGIC
926
MACHINE-LEARNING MODEL
928
930
932
NETWORK DESIGN DATA
NETWORK CONFIGURATION TASK DATA
WORKFLOW EXECUTION DATA
902
ENVIRONMENT

WORKFLOW-BASED CONFIGURATION OF DEVICES FROM A CLOUD SAAS CONTROLLER

The present disclosure relates to network configuration. More particularly, the present disclosure relates to configuring network devices in an on-premises data center from a cloud-based controller.

BACKGROUND

Network configuration, particularly in large data centers, can be a complex task that demands careful planning and execution. Network devices such as switches and routers need to be configured to communicate with each other and with external networks. This may involve setting up network protocols, assigning internet protocol (IP) addresses, and managing network traffic. Misconfigurations can lead to network outages, reduced performance, and security vulnerabilities.

More recently, cloud-based controllers have been introduced to manage network configurations. These controllers can remotely configure network devices, monitor network performance, and troubleshoot network issues. However, configuring a group of switches in an on-premises data center from a cloud-based controller may present its own set of challenges. By way of a non-limiting example, if a switch is misconfigured, the entire connected group of switches in the fabric may lose connectivity to the cloud controller, potentially disrupting the entire network.

Moreover, maintaining consistent and error-free configurations on each network device can be crucial to ensure uninterrupted connectivity with the cloud controller. This is particularly important when the connection to the cloud controller is made through the primary data plane of the network devices, as any disruption may affect the data flow associated with the fabric. Current techniques for managing these configurations can often involve manual processes that are time-consuming and prone to errors. There is a need for a more efficient and reliable technique for configuring network devices from a cloud-based controller.

SUMMARY OF THE DISCLOSURE

Systems and methods for configuring network devices in an on-premises data center from a cloud-based controller in accordance with embodiments of the disclosure are described herein. In some embodiments, a network controller node includes a processor, at least one network interface controller configured to provide access to a network, and a memory communicatively coupled to the processor, wherein the memory includes a network management logic. The logic is configured to receive an indication of a network configuration task from a user node, generate a workflow based on the network configuration task, the workflow including one or more actions for one or more network devices, each action in the one or more actions being associated with a network device in the one or more network devices, and cause the one or more network devices to attempt to perform the one or more actions based on the generated workflow.

In some embodiments, a network controller node is claimed wherein to cause the one or more network devices to attempt to perform the one or more actions, the network management logic is further configured to transmit, for each action, a corresponding command to an associated network device.

In some embodiments, the corresponding command is associated with a corresponding configuration, and the network management logic is further configured to transmit, for each action, the corresponding configuration to the associated network device.

In some embodiments, the network management logic is further configured to receive, from a network device in the one or more network devices, an indication of a failure to perform an action associated with the network device at the network device.

In some embodiments, the network management logic is further configured to identify a remedial action for the network device based on the indication of the failure, and transmit an indication of the remedial action to the network device.

In some embodiments, the network configuration task includes creation of a virtual network.

In some embodiments, the one or more actions in the generated workflow include selecting an autonomous system number (ASN) for an ethernet virtual private network (EVPN) configuration, adding a loopback device for a virtual extensible local area network (VXLAN) tunnel endpoint (VTEP) device, assigning one or more internet protocol (IP) addresses to the loopback device, adding a virtual routing and forwarding (VRF) configuration, and configuring one or more switched virtual interfaces (SVIs).

In some embodiments, the one or more actions in the generated workflow further include adding one or more ports to an underlay network.

In some embodiments, the network configuration task includes deletion of a virtual network.

In some embodiments, the one or more actions in the generated workflow include removing one or more internet protocol (IP) addresses from a loopback device, deleting the loopback device, and releasing an assigned autonomous system number (ASN).

In some embodiments, the one or more actions in the generated workflow further include removing one or more ports from an underlay network.

In some embodiments, the network configuration task includes addition of one or more hosts to a virtual network.

In some embodiments, a network controller node is claimed wherein the one or more actions in the generated workflow include adding one or more virtual local area networks (VLANs) to a system associated with the virtual network, disabling an internet protocol version 6 (IPv6) link-local configuration on one or more physical ports connected to the one or more hosts, and adding the one or more VLANs to the one or more physical ports.

In some embodiments, the network configuration task includes removal of one or more hosts from a virtual network.

In some embodiments, the one or more actions in the generated workflow include removing one or more virtual local area networks (VLANs) from one or more physical ports connected with the one or more hosts, and removing the one or more VLANs from a system associated with the virtual network.

In some embodiments, the one or more actions in the generated workflow further include reenabling an internet protocol version 6 (IPv6) link-local configuration on the one or more physical ports.

In some embodiments, a network device includes a processor, at least one network interface controller configured to provide access to a network, and a memory communicatively coupled to the processor, wherein the memory includes a network management logic. The logic is configured to receive an indication of an action for the network device from a network controller node, the action being part of a workflow associated with a network configuration task, and attempt to perform the action.

In some embodiments, the indication of the action for the network device includes a command or a configuration.

In some embodiments, a network device is claimed wherein the network management logic is further configured to identify a failure to perform the action based on the attempt to perform the action, transmit an indication of the failure to perform the action to the network controller node, receive an indication of a remedial action from the network controller node based on the indication of the failure to perform the action, and attempt to perform the remedial action based on the indication of the remedial action.

In some embodiments, a method for network management includes receiving an indication of a network configuration task from a user node, generating a workflow based on the network configuration task, the workflow including one or more actions for one or more network devices, each action in the one or more actions being associated with a network device in the one or more network devices, and causing the one or more network devices to attempt to perform the one or more actions based on the generated workflow.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
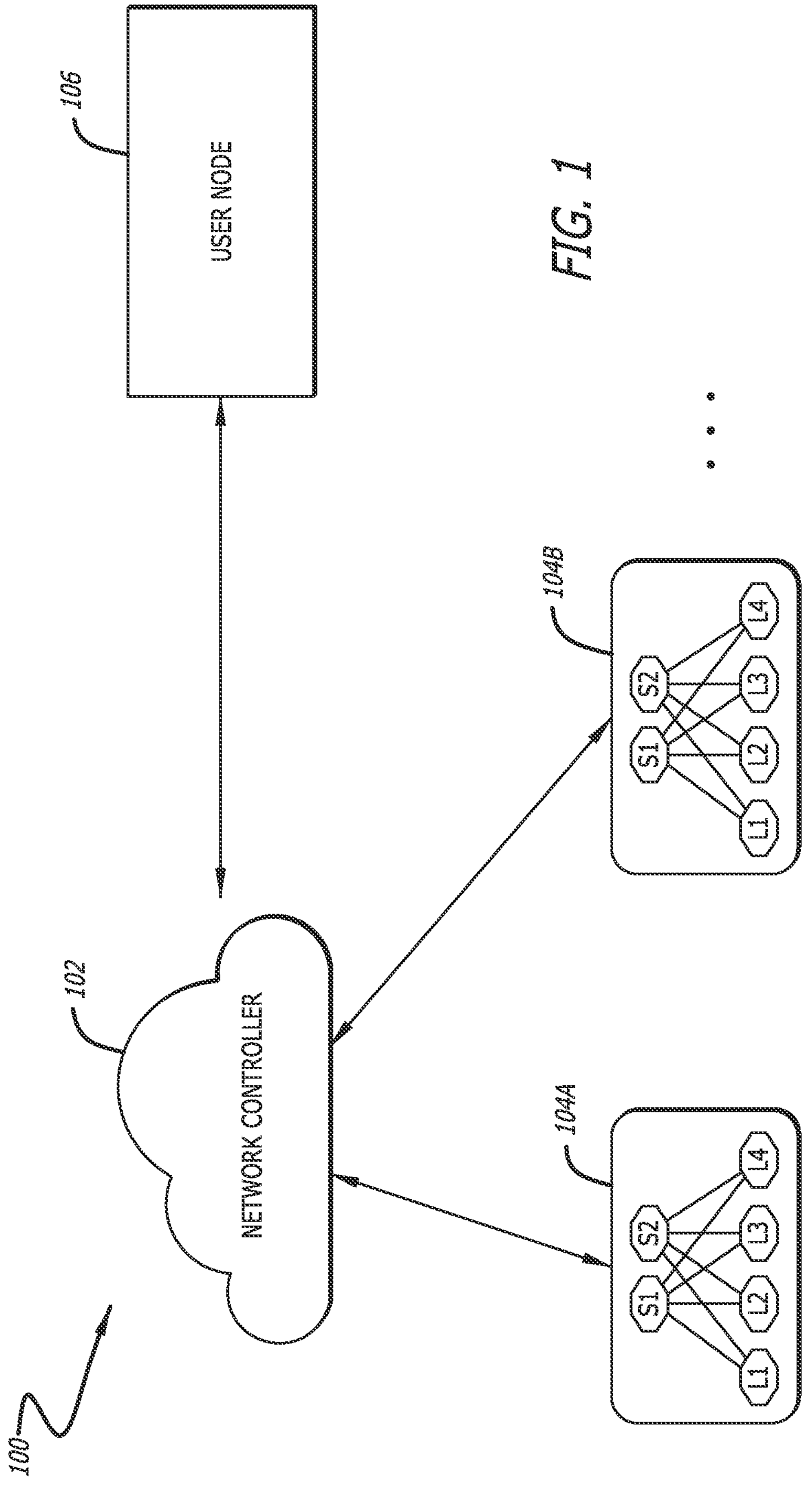
FIG. 1 is a diagram illustrating an environment in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that provide a workflow-based approach for configuring network devices in an on-premises data center from a cloud-based controller. In many embodiments, a user (e.g., a network administrator) can design a network (e.g., utilizing a network design studio tool), and can create tasks related to the network configuration. A cloud-based network controller may translate each task into a workflow including one or more actions, and may cause the actions to be executed on the appropriate network devices according to the workflow. In a number of embodiments, the network devices can provide feedback about any failed configurations. Subsequent to reporting a failed configuration, a network device may wait for further instructions from the cloud-based network controller.

In a variety of embodiments, a user may utilize a network design studio tool to design a network. The network design studio tool can allow a user to specify the desired network design. The network design studio tool can also allow the user to order network devices (e.g., switches or routers). In some embodiments, the user can specify tasks related to the network configuration. The tasks may relate to operations that are to be performed on the network devices. Non-limiting examples of network configuration tasks may include creating or deleting a virtual network, or adding or removing hosts from a virtual network. In more embodiments, the cloud-based network controller can translate each task into a workflow, which may be a sequence of actions that need to be executed at the appropriate network devices in a specific order.

In additional embodiments, an action may be associated with a command (e.g., a command line interface (CLI) command) and/or a configuration. In further embodiments, a configuration associated with an action can be for an on-host daemon (e.g., a background process that runs on a network device), such as, but not limited to, a routing daemon, a virtual extensible local area network (VXLAN) daemon, and so on. Accordingly, in still more embodiments, to cause an action to be executed at a network device, the cloud-based network controller may send the corresponding command and/or configuration to the network device. Upon receiving the command and/or configuration, the network device can then execute the action.

In still further embodiments, if a network device fails a configuration (i.e., an action fails to be completed) at any stage, the network device may send detailed data back to the cloud-based network controller about what went wrong. In still additional embodiments, the network device can then wait for further instructions from the cloud-based network controller on how to proceed. The feedback mechanism may ensure that any issues with the configuration are quickly identified and addressed, minimizing the impact on the network.

In some more embodiments, if the network configuration task is creating a virtual network, the actions in the associated workflow may involve selecting an autonomous system number (ASN) for the ethernet virtual private network (EVPN) configuration, (possibly) adding ports to an underlay network, adding a loopback device for the VXLAN tunnel endpoint (VTEP) device, assigning internet protocol (IP) addresses to the loopback (VTEP) device, adding a virtual routing and forwarding (VRF) configuration, and configuring one or more switched virtual interfaces (SVIs). In certain embodiments, if the network configuration task is deleting a virtual network, the actions in the associated workflow may involve removing IP addresses from a loopback device, deleting the loopback device, (possibly) removing ports from the underlay network, and releasing (deallocating, freeing up) the assigned ASN number.

In yet more embodiments, if the network configuration task is adding hosts to a virtual network, the actions in the associated workflow may involve adding virtual local area networks (VLANs) to the system, disabling IP version 6 (IPv6) link-local configuration on the physical ports connected to the hosts, and adding the VLANs to the physical ports. In still yet more embodiments, if the network configuration task is removing hosts from a virtual network, the actions in the associated workflow may involve removing VLANs from physical ports, (possibly) reenabling IPv6 link-local configuration on the host ports, and removing the VLANs from the system.

Therefore, the workflow-based approach may provide a more streamlined and efficient mechanism for configuring network devices from a cloud-based controller. The approach can bring about consistent and error-free configurations, maintain uninterrupted connectivity with the cloud controller by the network devices, and quickly identify and address any issues with the configuration.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, functional programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating an environment 100 in accordance with various embodiments of the disclosure is shown. In the embodiments shown in FIG. 1, a cloud-based network controller 102 may interact with fabrics (fabric pods) 104 (e.g., fabrics **104*a* and 104*b*) and a user node 106. In many embodiments, each fabric 104 can include multiple network devices/nodes including switches and routers. In a number of embodiments, the user node 106 may be a user terminal device, a user mobile device, and so on. A network design studio tool may run at the user node 106**.

In a variety of embodiments, each network device (e.g., switch) in the fabrics 104 may dynamically register with the cloud-based network controller 102. The registration can enable the network controller 102 to receive real-time feeds of data it is interested in. By way of non-limiting examples, the data can include physical port status, fan speeds, environmental sensor readings such as, but not limited to, temperature readings, and data about logical networking constructs such as, but not limited to, logical interface counters, and so on.

In some embodiments, the cloud-based network controller 102 may integrate real-time monitoring and can also take into account the measured state of the network and network devices when determining the configuration to be distributed (pushed out) to the network devices. The configuration may be determined such that it meets the stated goal or intent of the customer (e.g., the user at the user node 106). In more embodiments, the network controller 102 can combine intent-based or concrete configuration management with conditional configuration distribution and dissemination. Further, the network controller 102 may monitor the resulting managed elements for compliance, errors, and so on, and may take actions to reconcile (correct) incorrect states.

In additional embodiments, a user at the user node 106 can utilize a network design studio tool to design a network (e.g., one or more of the fabrics 104). The user may create tasks related to the network configuration. Non-limiting examples of network configuration tasks may include creating or deleting a virtual network, or adding or removing hosts from a virtual network. Based on the user input, indications of one or more network configuration tasks may be sent to the cloud-based network controller 102 from the user node 106. In further embodiments, the network controller 102 can translate a task into a workflow, which may include one or more actions to be executed at the appropriate network devices in a specified order. In still more embodiments, the network controller 112 can send indications of the actions (e.g., commands and/or configurations) to the appropriate network devices to cause the actions to be executed at the network devices. A network configuration task may be completed as the associated actions are successfully executed at the appropriate network devices.

Although a specific embodiment for an environment suitable for carrying out the various steps, processes, methods, and operations described herein is discussed with respect to FIG. 1, any of a variety of systems and/or processes may be utilized in accordance with embodiments of the disclosure. For example, the cloud-based network controller may be integrated with a network analytics platform that utilizes machine learning processes to predict network behavior and optimize network performance. The elements depicted in FIG. 1 may also be interchangeable with other elements of FIGS. 2-9 as required to realize a particularly desired embodiment.

Figure 2:
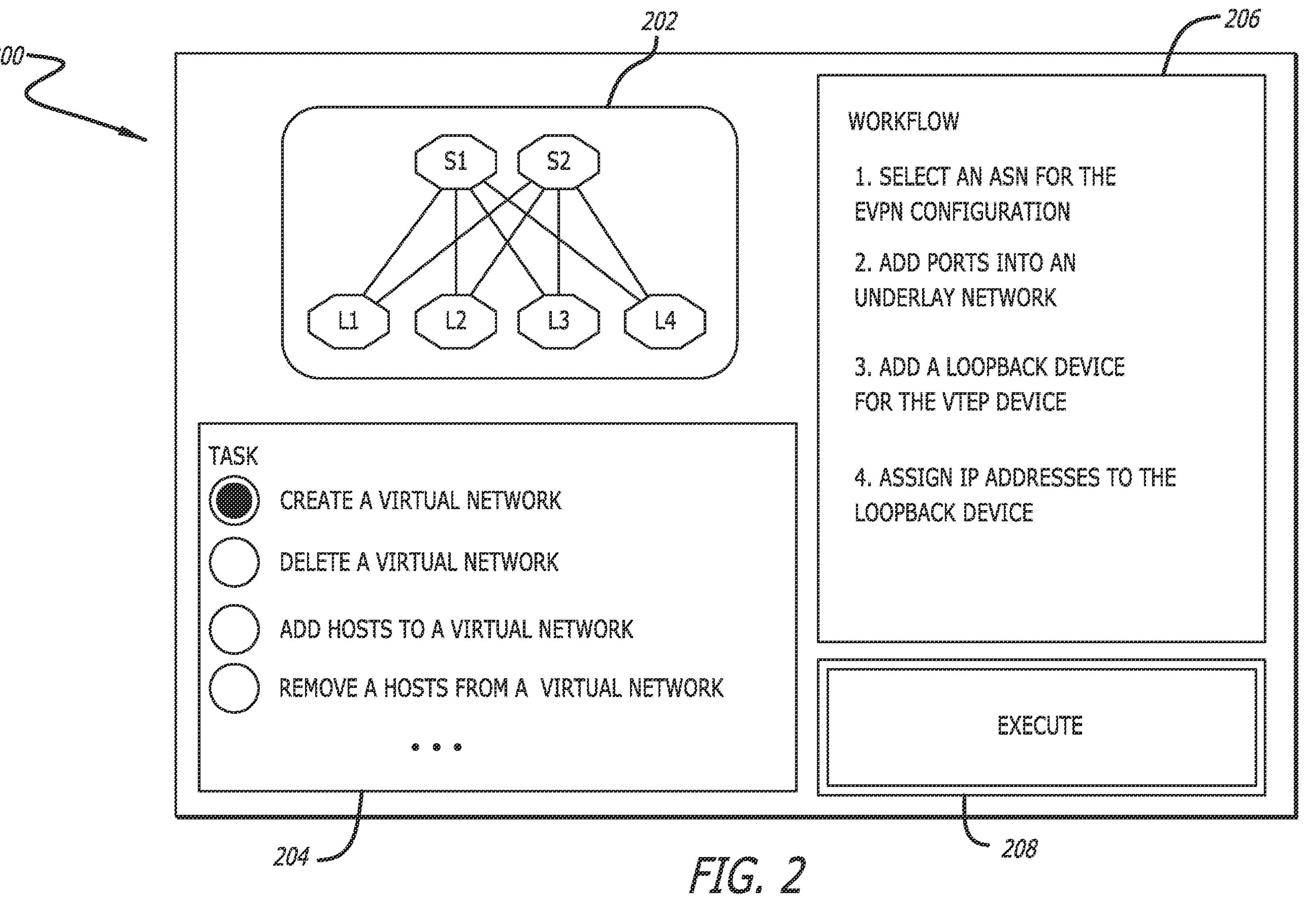
FIG. 2 is a diagram illustrating a graphical user interface (GUI) for the network design studio tool in accordance with various embodiments of the disclosure.

Referring to FIG. 2, a diagram illustrating a graphical user interface (GUI) 200 for the network design studio tool in accordance with various embodiments of the disclosure is shown. In the embodiments shown in FIG. 2, the GUI 200, which can be displayed at the user node (e.g., the user node 106), may include several distinct regions that facilitate the design and configuration of the network. In many embodiments, a region 202 of the GUI 200 can provide an overview of a network, such as, but not limited to, a fabric 104 or a virtual network. The overview may allow the user to visualize the network layout and understand the relationships between different network nodes, devices, and/or elements.

In a number of embodiments, a region 204 of the GUI 200 may display various network configuration tasks. The user can choose a task by selecting the corresponding option button. In the embodiments shown in FIG. 2, the tasks can include, but are not limited to, creating a virtual network, deleting a virtual network, adding hosts to a virtual network, and removing hosts from a virtual network. Further, as shown, the task "create a virtual network" has been chosen by the user.

In a variety of embodiments, a region 206 of the GUI 200 may display the workflow generated by the cloud-based network controller, such as the network controller 102, based on the network configuration task chosen by the user in the region 204. The workflow can include a sequence of actions to be executed. In the embodiments shown, the workflow may include four actions: selecting an ASN for the EVPN configuration, adding ports into an underlay network, adding a loopback device for the VTEP device, and assigning IP addresses to the loopback device. In some embodiments, the status of each action, such as to be executed, being executed, success, or failure, can also be displayed in the region 206. As shown, the action "select an ASN for the EVPN configuration" is shown in bold, indicating that the action is currently being executed.

In more embodiments, the GUI 200 may include an "execute" button 208. When the user activates this button, and the network controller receives the indication to that effect from the user node, the network controller can start to cause the appropriate network devices to execute the actions according to the workflow shown in the region 206. This can involve the network controller transmitting corresponding commands and/or configurations to the appropriate network devices.

Although a specific embodiment for a GUI for the network design studio tool suitable for carrying out the various steps, processes, methods, and operations described herein is discussed with respect to FIG. 2, any of a variety of systems and/or processes may be utilized in accordance with embodiments of the disclosure. For example, the GUI may be enhanced with a feature that allows the user to simulate the impact of a network configuration task before it is executed. The elements depicted in FIG. 2 may also be interchangeable with other elements of FIGS. 1 and 3-9 as required to realize a particularly desired embodiment.

Figure 3:
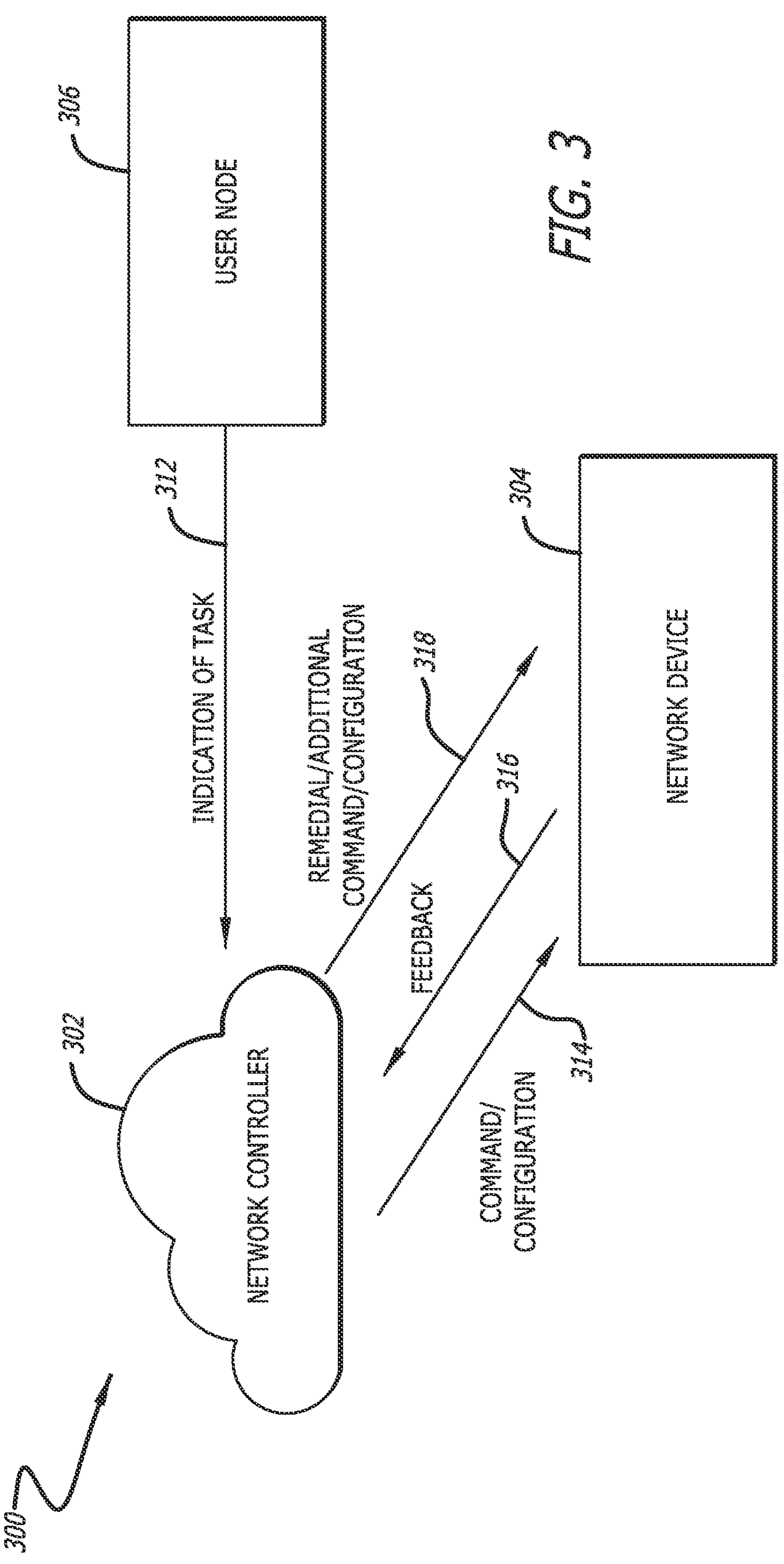
FIG. 3 is a diagram illustrating the interaction between a cloud-based network controller, a network device, and a user node in accordance with various embodiments of the disclosure.

Referring to FIG. 3, a diagram 300 illustrating the interaction between a cloud-based network controller, a network device, and a user node in accordance with various embodiments of the disclosure is shown. The interaction may facilitate the execution of network configuration tasks. In many embodiments, the user at the user node 306 may select a network configuration task, which can then be transmitted as an indication 312 to the network controller 302 (e.g., a cloud-based network controller). The task may involve operations such as, but not limited to creating or deleting a virtual network, or adding or removing hosts from a virtual network.

In a number of embodiments, upon receiving the task indication, the network controller 302 may translate the task into a workflow. Each action in the workflow can be associated with one or more specific network devices, such as network device 304. In a variety of embodiments, at 314, the network controller 302 may then transmit the corresponding command or configuration for an action in the workflow to the associated network device 304.

In some embodiments, the network device 304 may attempt to execute the action according to the command or configuration received from the network controller 302. Following the attempted execution, the network device 304 can transmit feedback 316 to the network controller 302. The feedback may relate to the execution status of the action, such as being executed, success, or failure.

In more embodiments, if the feedback 316 from the network device 304 indicates a failure to execute the action, the network controller 302 may determine a remedial action to be executed by the network device 304. Further, at 318, the network controller 302 may transmit the corresponding remedial commands or configurations to the network device 304. In additional embodiments, the network device 304 can execute the remedial action based on the remedial commands or configurations. This may ensure that any issues with the configuration are quickly identified and addressed, minimizing the impact on the network.

Although a specific embodiment for the interaction between a network controller, a network device, and a user node suitable for carrying out the various steps, processes, methods, and operations described herein is discussed with respect to FIG. 3, any of a variety of systems and/or processes may be utilized in accordance with embodiments of the disclosure. For example, the network controller may be equipped with machine learning capabilities to optimize the order of actions in the workflow based on past execution results. The elements depicted in FIG. 3 may also be interchangeable with other elements of FIGS. 1, 2, and 4-9 as required to realize a particularly desired embodiment.

Figure 4:
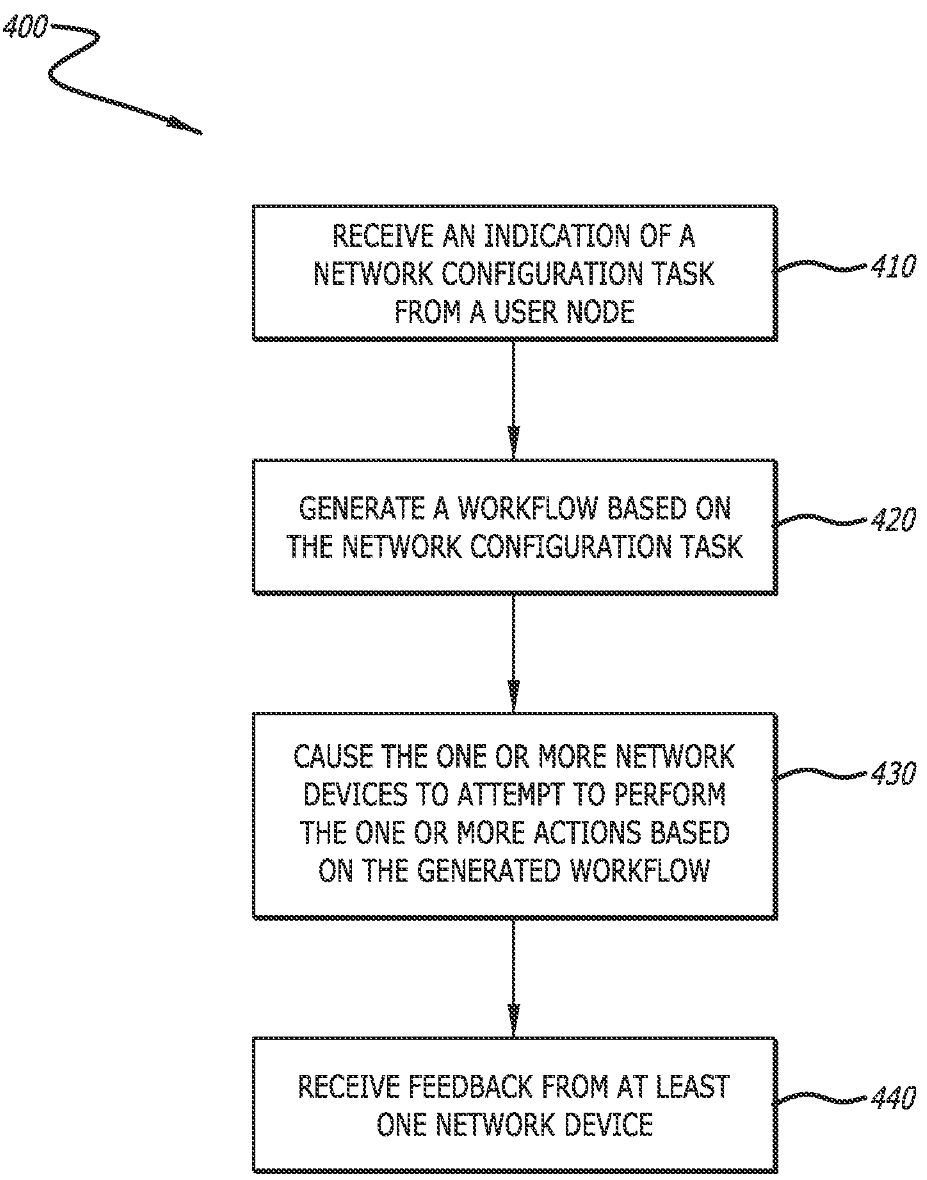
FIG. 4 is a flowchart showing a process for managing network configuration tasks in accordance with various embodiments of the disclosure.

Referring to FIG. 4, a flowchart showing a process 400 for managing network configuration tasks in accordance with various embodiments of the disclosure is shown. In many embodiments, the process 400 may receive an indication of a network configuration task from a user node (block 410). The task can involve operations such as creating or deleting a virtual network, or adding or removing hosts from a virtual network. The task indication may be received by a network controller node via a network interface controller that provides access to a network.

In a number of embodiments, the process 400 may generate a workflow based on the network configuration task (block 420). The workflow can include one or more actions for one or more network devices. Each action may be associated with a specific network device. The generation of the workflow can involve translating the task into a sequence of actions that are to be performed on the network devices.

In a variety of embodiments, the process 400 may cause the one or more network devices to attempt to perform the one or more actions based on the generated workflow (block 430). This can include transmitting, for each action, a corresponding command or configuration to the associated network device. The command or configuration may be associated with a specific action in the workflow, such as, but not limited to, selecting an ASN for an EVPN configuration, or adding a loopback device for a VTEP device.

In some embodiments, the process 400 can receive feedback from at least one network device (block 440). The feedback may relate to the execution status of the action, such as being executed, success, or failure. If the feedback indicates a failure to perform an action, the network controller node can identify a remedial action for the network device based on the indication of the failure and can transmit an indication of the remedial action to the network device.

Although a specific embodiment for a process for managing network configuration tasks suitable for carrying out the various steps, processes, methods, and operations described herein is discussed with respect to FIG. 4, any of a variety of systems and/or processes may be utilized in accordance with embodiments of the disclosure. For example, the process may be integrated with a network analytics platform that uses real-time data to dynamically adjust the workflow based on the current state of the network and network devices. The elements depicted in FIG. 4 may also be interchangeable with other elements of FIGS. 1-3 and 5-9 as required to realize a particularly desired embodiment.

Figure 5:
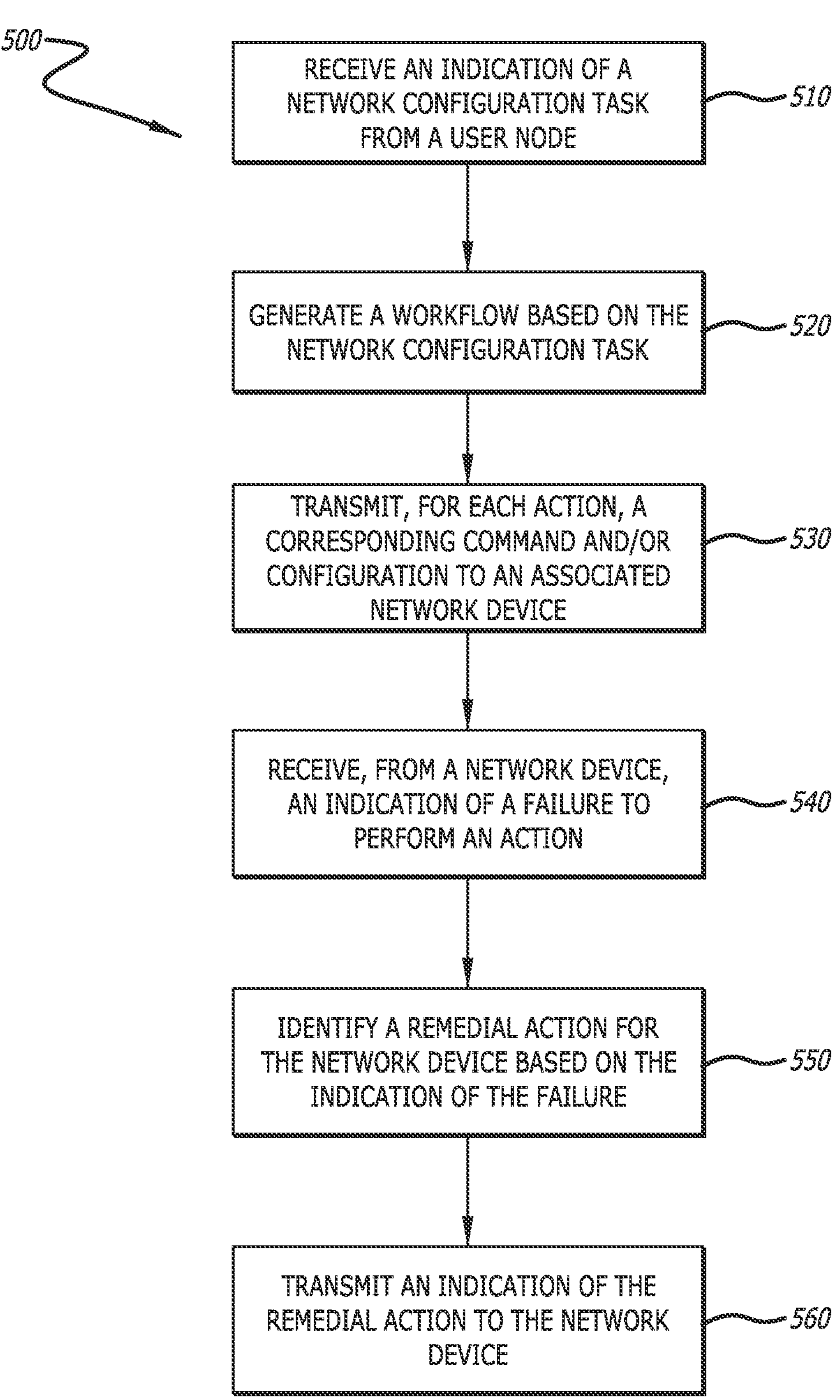
FIG. 5 is a flowchart showing a process for managing network configuration tasks in accordance with various embodiments of the disclosure.

Referring to FIG. 5, a flowchart showing a process 500 for managing network configuration tasks in accordance with various embodiments of the disclosure is shown. In many embodiments, the process 500 may receive an indication of a network configuration task from a user node (block 510). The task can involve operations such as, but not limited to, creating or deleting a virtual network, or adding or removing hosts from a virtual network. The task indication may be received by the network controller node via a network interface controller that provides access to a network.

In a number of embodiments, the process 500 may generate a workflow based on the network configuration task (block 520). The workflow can include one or more actions for one or more network devices. Each action may be associated with a specific network device. The generation of the workflow can involve translating the task into a sequence of actions that are to be performed on the network devices.

In a variety of embodiments, the process 500 may transmit, for each action, a corresponding command and/or configuration to an associated network device (block 530). This can involve sending specific instructions or configurations to the network device to guide the execution of the action. The command or configuration may be associated with a specific action in the workflow, such as, but not limited to, selecting an ASN for an EVPN configuration, or adding a loopback device for a VTEP device.

In some embodiments, the process 500 can receive, from a network device, an indication of a failure to perform an action (block 540). In more embodiments, the indication of the failure may be part of feedback provided by the network device. The feedback can be used to identify issues with the configuration that need to be addressed.

In additional embodiments, the process 500 can identify a remedial action for the network device based on the indication of the failure (block 550). In further embodiments, identifying the remedial action may involve determining an alternative action or configuration that can be used to address the failure. The remedial action can be identified based on one or more of a set of predefined rules, historical data, or machine learning algorithms that analyze the nature of the failure and suggest the most effective solution.

In still more embodiments, the process 500 can transmit an indication of the remedial action to the network device (block 560). This may involve sending a corresponding remedial command or configuration that can instruct the network device to perform the remedial action. In still further embodiments, the transmission of the remedial action can be prioritized based on the severity of the failure to ensure that critical issues are addressed promptly to maintain network stability and performance.

Although a specific embodiment for a process for managing network configuration tasks suitable for carrying out the various steps, processes, methods, and operations described herein is discussed with respect to FIG. 5, any of a variety of systems and/or processes may be utilized in accordance with embodiments of the disclosure. For example, the process may be enhanced with predictive analytics capabilities to anticipate potential configuration issues and proactively transmit remedial commands or configurations. The elements depicted in FIG. 5 may also be interchangeable with other elements of FIGS. 1-4 and 6-9 as required to realize a particularly desired embodiment.

Figure 6:
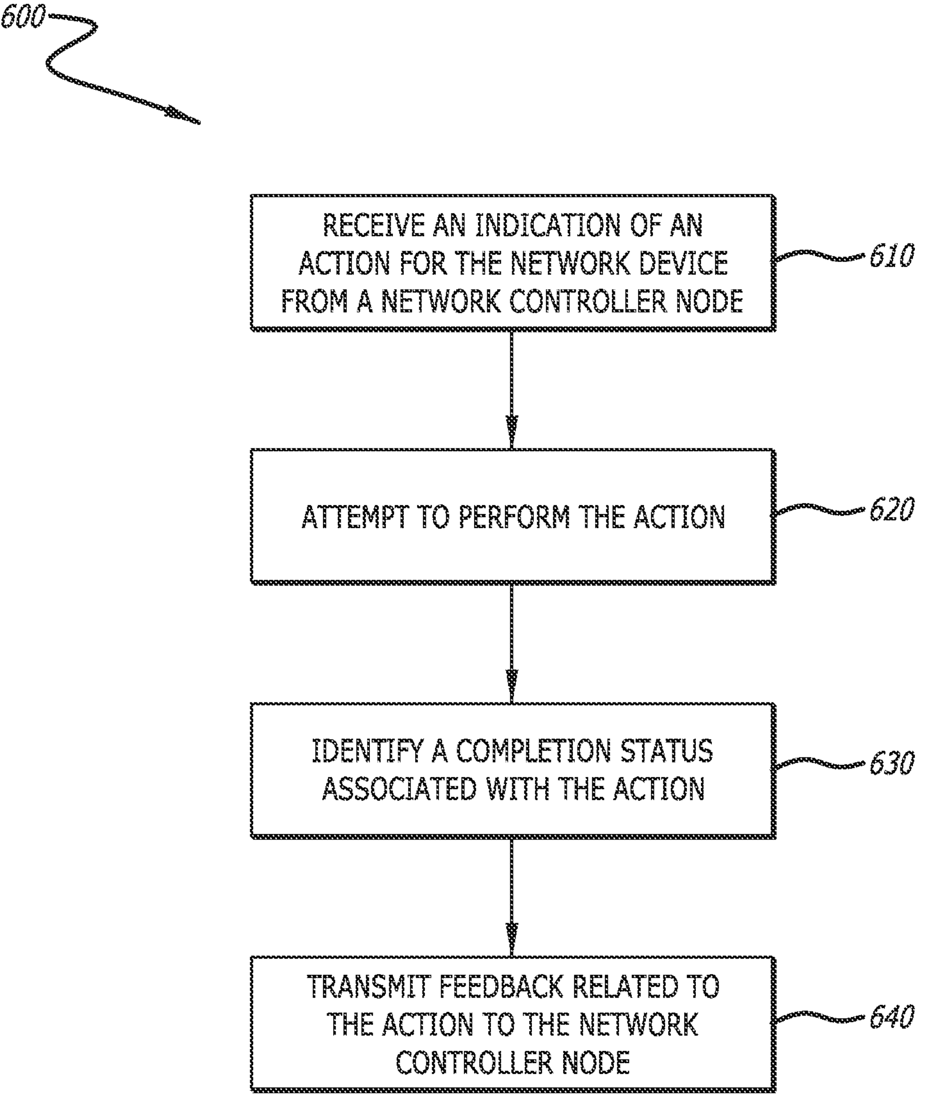
FIG. 6 is a flowchart showing a process for executing actions and providing feedback in a network device in accordance with various embodiments of the disclosure.

Referring to FIG. 6, a flowchart showing a process 600 for executing actions and providing feedback in a network device in accordance with various embodiments of the disclosure is shown. In many embodiments, the process 600 may receive an indication of an action for the network device from a network controller node (block 610). The action can be part of a workflow associated with a network configuration task. The indication of the action may include a command and/or a configuration that guides the execution of the action.

In a number of embodiments, the process 600 may attempt to perform the action (block 620). This can involve executing the command or applying the configuration received from the network controller node. The action may be related to a specific network configuration task. A non-limiting example of the action may be adding a loopback device for a VTEP device.

In a variety of embodiments, the process 600 can identify a completion status associated with the action (block 630). The completion status may relate to the execution of the action. Accordingly, the completion status can indicate whether the action was successfully performed or if there was a failure. The identification of the completion status may be based on the results of the attempt to perform the action.

In some embodiments, the process 600 can transmit feedback related to the action to the network controller node (block 640). The feedback can include the completion status identified in block 630. This feedback can be used by the network controller node to monitor the progress of the network configuration task and to identify any issues that need to be addressed.

Although a specific embodiment for a process suitable for executing actions and providing feedback in a network device suitable for carrying out the various steps, processes, methods, and operations described herein is discussed with respect to FIG. 6, any of a variety of systems and/or processes may be utilized in accordance with embodiments of the disclosure. For example, the process can be enhanced with self-diagnostic capabilities that allow the network device to automatically identify and report any issues that prevent the successful execution of the action. The elements depicted in FIG. 6 may also be interchangeable with other elements of FIGS. 1-5 and 7-9 as required to realize a particularly desired embodiment.

Figure 7:
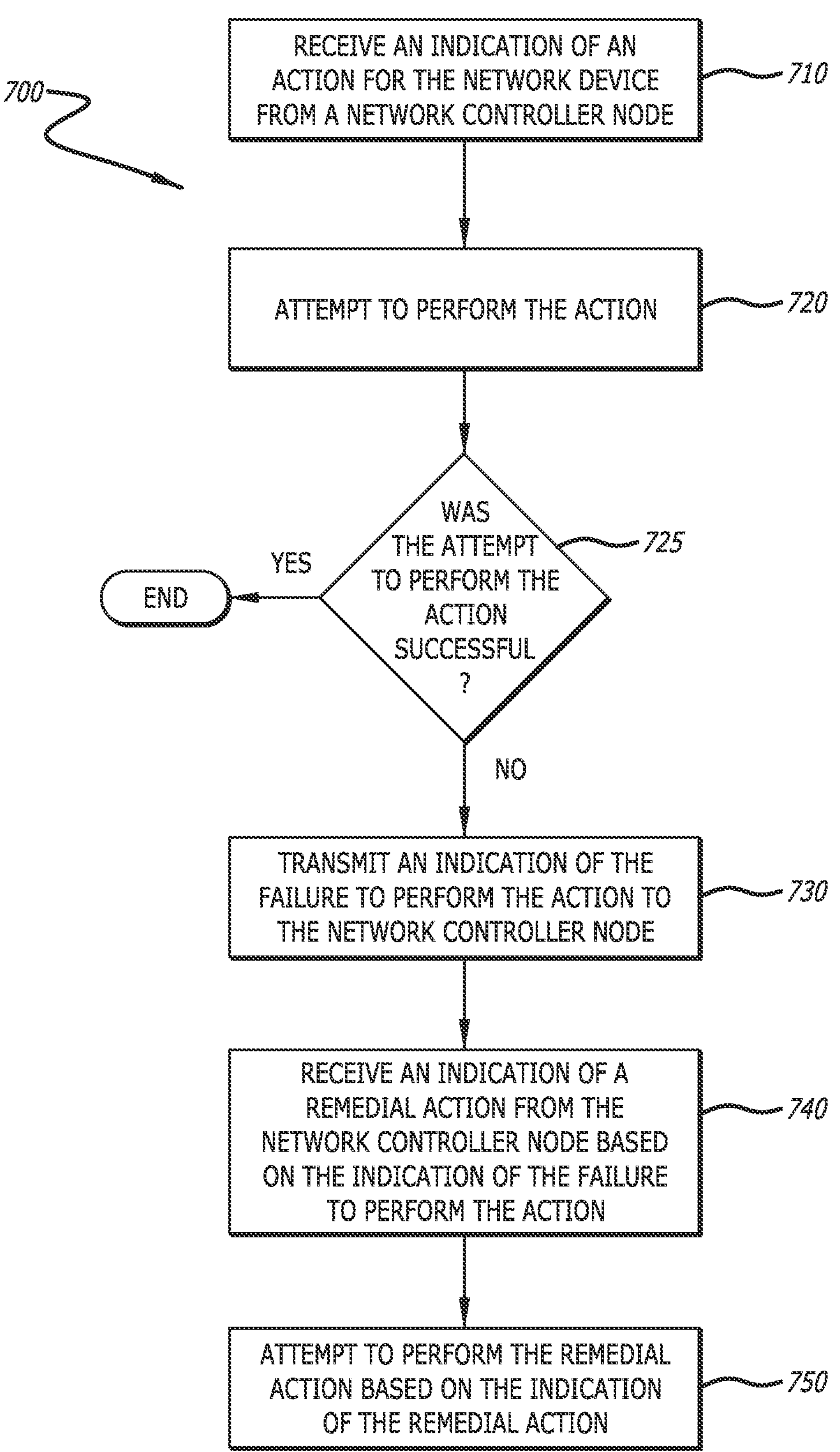
FIG. 7 is a flowchart showing a process for executing actions, handling failures, and performing remedial actions in a network device in accordance with various embodiments of the disclosure.

Referring to FIG. 7, a flowchart showing a process 700 for executing actions, handling failures, and performing remedial actions in a network device in accordance with various embodiments of the disclosure is shown. In many embodiments, the process 700 may receive an indication of an action for the network device from a network controller node (block 710). The action can be part of a workflow associated with a network configuration task. The indication of the action may include a command or a configuration that guides the execution of the action.

In a number of embodiments, the process 700 may attempt to perform the action (block 720). This can involve executing the command or applying the configuration received from the network controller node. The action may be related to a specific network configuration task. A non-limiting example of the action may be adding a loopback device for a VTEP device.

In a variety of embodiments, the process 700 can determine if the attempt to perform the action was successful (block 725). In some embodiments, if the action was successfully performed, the process ends. However, in more embodiments, when the action was not successfully performed, the process 700 can transmit an indication of the failure to perform the action to the network controller node.

In additional embodiments, when the action was not successfully performed, the process 700 can transmit an indication of the failure to perform the action to the network controller node (block 730). The feedback can be used by the network controller node to monitor the progress of the network configuration task and to identify any issues that need to be addressed. In further embodiments, the indication of failure may include detailed error codes or messages that provide insights into the nature of the failure.

In still more embodiments, the process 700 can receive an indication of a remedial action from the network controller node based on the indication of the failure to perform the action (block 740). This may involve receiving a remedial command or configuration that instructs the network device to perform the remedial action. The remedial action can be tailored to the specific failure, taking into account factors such as, but not limited to, the type of network device, the nature of the action, and/or the details of the failure.

In still further embodiments, the process 700 can attempt to perform the remedial action based on the indication of the remedial action (block 750). The attempt to perform the remedial action may involve executing the received remedial command or applying the received remedial configuration. Furthermore, in still additional embodiments, the network device may log the results of the remedial action attempt, which can be useful for future troubleshooting and system improvement efforts.

Although a specific embodiment for a process suitable for executing actions, handling failures, and performing remedial actions in a network device suitable for carrying out the various steps, processes, methods, and operations described herein is discussed with respect to FIG. 7, any of a variety of systems and/or processes may be utilized in accordance with embodiments of the disclosure. For example, the process could be enhanced with an automated retry mechanism that attempts to perform the action multiple times before declaring a failure. The elements depicted in FIG. 7 may also be interchangeable with other elements of FIGS. 1-6, 8, and 9 as required to realize a particularly desired embodiment.

Figure 8:
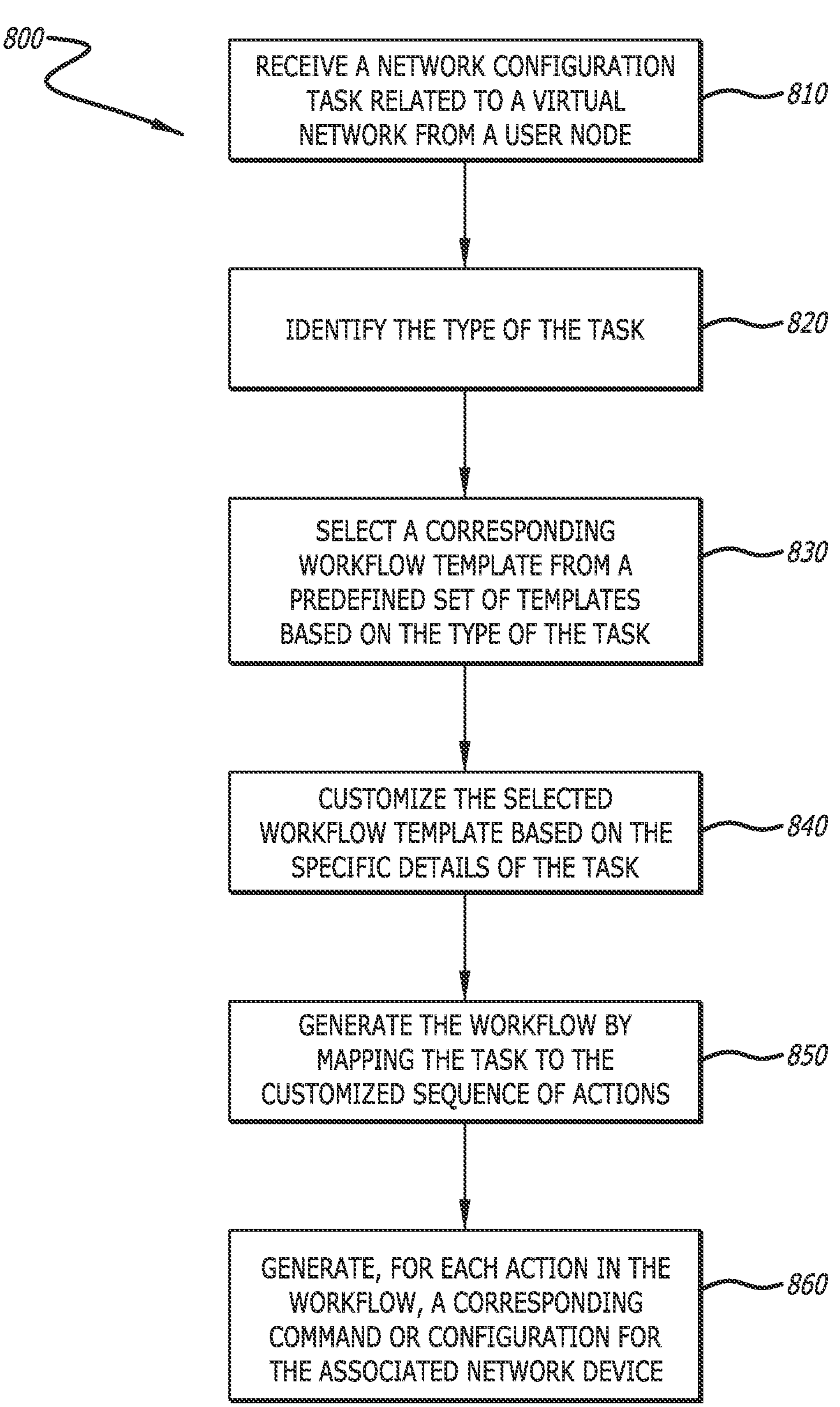
FIG. 8 is a flowchart showing a process for translating a network configuration task into a workflow in a network controller node in accordance with various embodiments of the disclosure.

Referring to FIG. 8, a flowchart showing a process 800 for translating a network configuration task into a workflow in a network controller node in accordance with various embodiments of the disclosure is shown. In many embodiments, the process 800 may receive a network configuration task related to a virtual network from a user node (block 810). The task can involve operations such as creating or deleting a virtual network, or adding or removing hosts from a virtual network. The task may be received by the network controller node via a network interface controller that provides access to a network.

In a number of embodiments, the process 800 may identify the type of the task (block 820). This can involve categorizing the task into one of several types, such as, but not limited to, creation, deletion, addition, or removal. The identification of the task type may be based on the specific operations involved in the task.

In a variety of embodiments, the process 800 may select a corresponding workflow template from a predefined set of templates based on the type of the task (block 830). Each template can outline a sequence of actions for a specific type of task. The selection of the template may be based on a mapping between task types and workflow templates.

In some embodiments, the process 800 may customize the selected workflow template based on the specific details of the task (block 840). This can involve modifying the template to include the identifiers of the virtual network and/or the host involved in the task. The customization of the template may ensure that the generated workflow is tailored to the specific requirements of the task.

In more embodiments, the process 800 may generate the workflow by mapping the task to the customized sequence of actions (block 850). This can involve creating a workflow that includes the sequence of actions defined in the customized template. The generation of the workflow may translate the high-level network configuration task into a set of specific actions that can be executed by network devices.

In additional embodiments, the process 800 may generate, for each action in the workflow, a corresponding command or configuration for the associated network device (block 860). This can involve translating each action into a command or configuration that can be understood and executed by the network device. The generated commands or configurations may be specific to the actions in the workflow and may guide the execution of the network configuration task.

Although a specific embodiment for a process suitable for translating a network configuration task into a workflow in a network controller node suitable for carrying out the various steps, processes, methods, and operations described herein is discussed with respect to FIG. 8, any of a variety of systems and/or processes may be utilized in accordance with embodiments of the disclosure. For example, the process could be enhanced with a machine learning model that optimizes the selection and customization of workflow templates based on past task execution results. The elements depicted in FIG. 8 may also be interchangeable with other elements of FIGS. 1-7 and 9 as required to realize a particularly desired embodiment.

Figure 9:
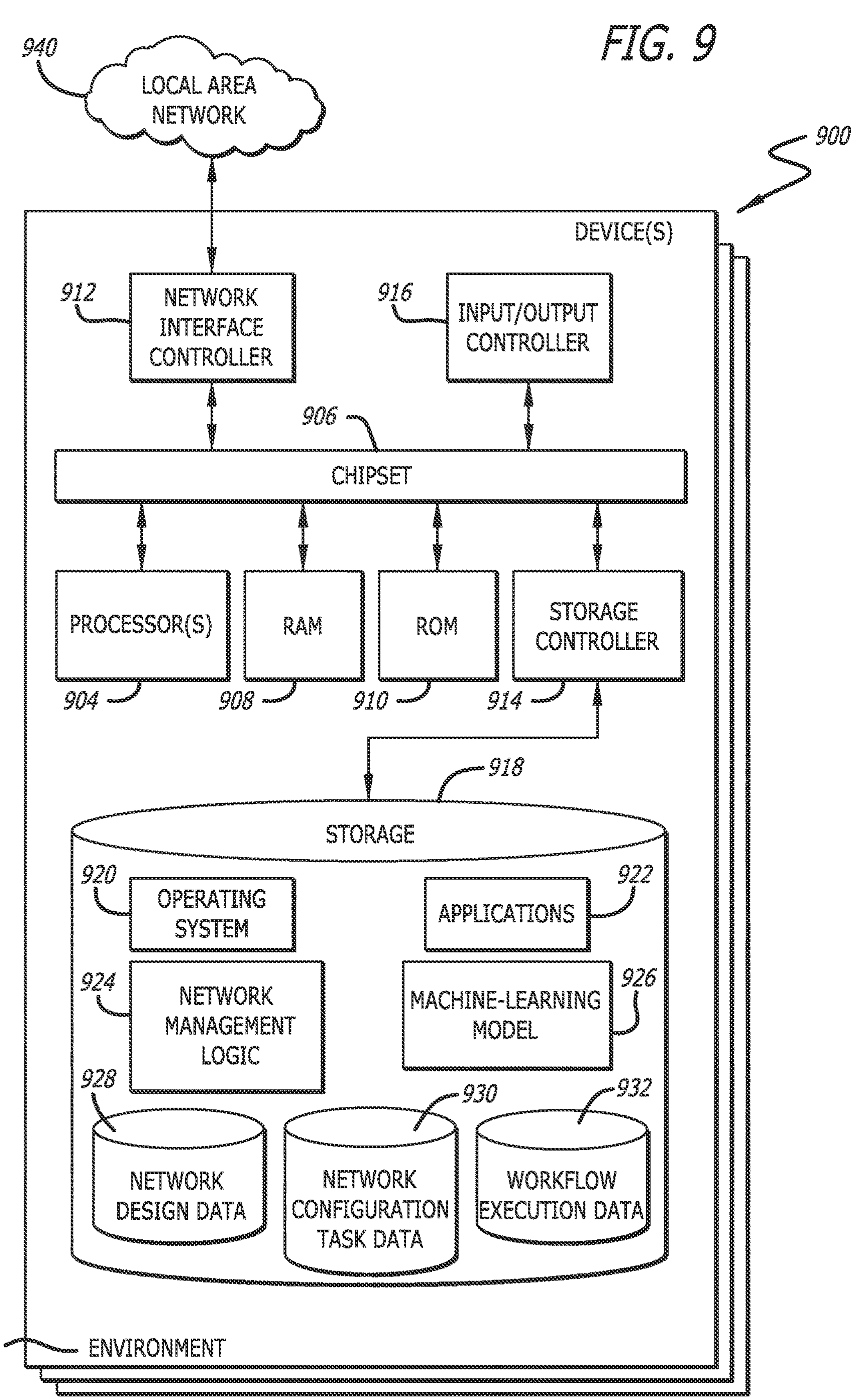
FIG. 9 is a conceptual block diagram for one or more devices capable of executing components and logic for implementing the functionality and embodiments described.

Referring to FIG. 9, a conceptual block diagram for one or more devices 900 capable of executing components and logic for implementing the functionality and embodiments described above is shown. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications 922, network design data 928, network configuration task data 930, and workflow execution data 932, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9, and can include other components that are not explicitly shown in FIG. 9, or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include a network management logic 924. The network management logic 924 may be capable of facilitating a variety of network configuration tasks. By way of non-limiting examples, the network management logic 924 can generate workflows based on network configuration tasks and can transmit corresponding commands or configurations to associated network devices.

In a number of embodiments, the storage 918 can include network design data 928. The network design data 928 may relate to the structure and configuration of the network. The network design data 928 can include details about network devices, their interconnections, and specific configurations. Accordingly, the network design data 928 may provide a comprehensive view of the network design and may facilitate efficient network management and optimization.

In various embodiments, the storage 918 can include network configuration task data 930. The network configuration task data 930 may relate to specific tasks for configuring the network. The network configuration task data 930 can include details about the tasks such as, but not limited to, the actions to be performed, the network devices involved, and/or the desired end state.

In still more embodiments, the storage 918 can include workflow execution data 932. The workflow execution data 932 may relate to the execution of workflows associated with network configuration tasks. The workflow execution data 932 can include details such as, but not limited to, the sequence of actions performed, the status of each action, and/or any issues encountered.

Finally, in many embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. The ML model 926 may be configured to analyze historical network configuration task data and workflow execution data, predict potential issues in network configuration tasks, and suggest optimized workflows or remedial actions to improve the efficiency and effectiveness of network management.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network controller node, comprising:

a processor;

at least one network interface controller configured to provide access to a network; and a memory communicatively coupled to the processor, wherein the memory comprises a network management logic that is configured to:

receive an indication of a network configuration task from a user node;

dynamically register one or more network devices to receive real-time feeds of data including physical port status and environmental sensor readings from the one or more network devices;

generate a workflow by selecting a workflow template based on a type of the network configuration task and customizing the selected workflow template to create the workflow including one or more actions for the network devices, each action in the one or more actions being associated with a network device in the one or more network devices;

wherein the customizing takes into account the real-time feeds of data to determine a configuration to be distributed to the one or more network devices; and cause the one or more network devices to attempt to perform the one or more actions based on the generated workflow to maintain uninterrupted connectivity with the network controller node, wherein a connection to the network controller node is made through a primary data plane of the one or more network devices.

2. The network controller node of claim 1, wherein to cause the one or more network devices to attempt to perform the one or more actions, the network management logic is further configured to transmit, for each action, a corresponding command to an associated network device.

3. The network controller node of claim 2, wherein the corresponding command is associated with a corresponding configuration, and the network management logic is further configured to transmit, for each action, the corresponding configuration to the associated network device.

4. The network controller node of claim 1, wherein the network management logic is further configured to receive, from a network device in the one or more network devices, an indication of a failure to perform an action associated with the network device at the network device.

5. The network controller node of claim 4, wherein the network management logic is further configured to:

identify a remedial action for the network device based on the indication of the failure; and transmit an indication of the remedial action to the network device.

6. The network controller node of claim 1, wherein the network configuration task includes creation of a virtual network.

7. The network controller node of claim 6, wherein the one or more actions in the generated workflow include:

selecting an autonomous system number (ASN) for an ethernet virtual private network (EVPN) configuration;

adding a loopback device for a virtual extensible local area network (VXLAN) tunnel endpoint (VTEP) device;

assigning one or more internet protocol (IP) addresses to the loopback device;

adding a virtual routing and forwarding (VRF) configuration; and configuring one or more switched virtual interfaces (SVIs).

8. The network controller node of claim 7, wherein the one or more actions in the generated workflow further include adding one or more ports to an underlay network.

9. The network controller node of claim 1, wherein the network configuration task includes deletion of a virtual network.

10. The network controller node of claim 9, wherein the one or more actions in the generated workflow include:

removing one or more internet protocol (IP) addresses from a loopback device;

deleting the loopback device; and releasing an assigned autonomous system number (ASN).

11. The network controller node of claim 10, wherein the one or more actions in the generated workflow further include removing one or more ports from an underlay network.

12. The network controller node of claim 1, wherein the network configuration task includes addition of one or more hosts to a virtual network.

13. The network controller node of claim 12, wherein the one or more actions in the generated workflow include:

adding one or more virtual local area networks (VLANs) to a system associated with the virtual network;

disabling an internet protocol version 6 (IPv6) link-local configuration on one or more physical ports connected to the one or more hosts; and adding the one or more VLANs to the one or more physical ports.

14. The network controller node of claim 1, wherein the network configuration task includes removal of one or more hosts from a virtual network.

15. The network controller node of claim 14, wherein the one or more actions in the generated workflow include:

removing one or more virtual local area networks (VLANs) from one or more physical ports connected with the one or more hosts; and removing the one or more VLANs from a system associated with the virtual network.

16. The network controller node of claim 15, wherein the one or more actions in the generated workflow further include reenabling an internet protocol version 6 (IPv6) link-local configuration on the one or more physical ports.

17. A network device, comprising:

a processor;

at least one network interface controller configured to provide access to a network; and a memory communicatively coupled to the processor, wherein the memory comprises a network management logic that is configured to:

dynamically register with a network controller node to provide real-time feeds of data including physical port status and environmental sensor readings;

receive an indication of an action for the network device from the network controller node, the action being part of a workflow associated with a network configuration task wherein the workflow is generated by the network controller node by selecting a workflow template based on a type of the network configuration task and customizing the selected workflow template based on the real-time feeds of data to determine a configuration to be distributed to the network device; and attempt to perform the action to maintain uninterrupted connectivity with the network controller node, wherein a connection to the network controller node is made through a primary data plane of the network device.

18. The network device of claim 17, wherein the indication of the action for the network device comprises a command or a configuration.

19. The network device of claim 17, wherein the network management logic is further configured to:

identify a failure to perform the action based on the attempt to perform the action;

transmit an indication of the failure to perform the action to the network controller node;

receive an indication of a remedial action from the network controller node based on the indication of the failure to perform the action; and attempt to perform the remedial action based on the indication of the remedial action.

20. A method for network management, comprising:

receiving an indication of a network configuration task from a user node;

dynamically registering one or more network devices to receive real-time feeds of data including physical port status and environmental sensor readings from the one or more network devices;

generating a workflow by selecting a workflow template based on a type of the network configuration task and customizing the selected workflow template to create the workflow including one or more actions for the network devices, each action in the one or more actions being associated with a network device in the one or more network devices wherein the customizing takes into account the real-time feeds of data to determine a configuration to be distributed to the one or more network devices; and causing the one or more network devices to attempt to perform the one or more actions based on the generated workflow to maintain uninterrupted connectivity with a network controller node, wherein a connection to the network controller node is made through a primary data plane of the one or more network devices.

* * * * *